United States Patent
Zhou et al.

(10) Patent No.: US 11,322,936 B2
(45) Date of Patent: May 3, 2022

(54) DISTRIBUTED BATTERY, BATTERY CONTROL METHOD, AND ELECTRIC VEHICLE

(71) Applicant: Huawei Technologies Co., Ltd., Shenzhen (CN)

(72) Inventors: Kui Zhou, Dongguan (CN); Boning Huang, Dongguan (CN); Wenping Tong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 16/672,064

(22) Filed: Nov. 1, 2019

(65) Prior Publication Data

US 2020/0062140 A1 Feb. 27, 2020

Related U.S. Application Data

(63) Continuation of application No. PCT/CN2018/085068, filed on Apr. 28, 2018.

(30) Foreign Application Priority Data

May 3, 2017 (CN) .......................... 201710304859.5

(51) Int. Cl.
*B60L 58/20* (2019.01)
*B60L 50/64* (2019.01)
(Continued)

(52) U.S. Cl.
CPC .............. *H02J 1/102* (2013.01); *B60L 50/64* (2019.02); *B60L 58/16* (2019.02); *B60L 58/20* (2019.02);
(Continued)

(58) Field of Classification Search
CPC .......... B60L 58/20; B60L 50/64; B60L 58/16; B60L 2240/547; H02J 7/0021; H02J 7/00;
(Continued)

(56) References Cited

U.S. PATENT DOCUMENTS 6,304,059 B1 10/2001 Chalasani et al.
9,755,439 B2 * 9/2017 Yamamoto et al. ...... H02J 7/00
(Continued)

FOREIGN PATENT DOCUMENTS

CN 101767541 B 11/2011
CN 103199580 A 7/2013
(Continued)

OTHER PUBLICATIONS

Machine Translation and Abstract of Chinese Publication No. CN101767541, Nov. 9, 2011, 17 pages.
(Continued)

*Primary Examiner* — Sun J Lin
(74) *Attorney, Agent, or Firm* — Conley Rose, P.C.

(57) ABSTRACT

Disclosed herein is a distributed battery pack power supply system, a charging control method, and a discharging control method, where a plurality of battery packs or battery groups is directly coupled in parallel or indirectly coupled in parallel as required using a charging/discharging circuit of the distributed battery pack power supply system and a corresponding control policy. A distributed battery includes a plurality of battery packs, and further includes a controller, a bidirectional voltage transformation circuit, a bypass circuit, a charging circuit, and a charging input end. Each battery pack corresponds to one bypass circuit and one bidirectional voltage transformation circuit.

26 Claims, 11 Drawing Sheets

(51) Int. Cl.
  *B60L 58/16* (2019.01)
  *H02J 7/00* (2006.01)
  *H01M 10/44* (2006.01)
  *H01M 10/42* (2006.01)
  *H02J 1/10* (2006.01)
  *H02M 3/158* (2006.01)

(52) U.S. Cl.
  CPC ....... *H01M 10/425* (2013.01); *H01M 10/441* (2013.01); *H02J 7/00* (2013.01); *H02J 7/0021* (2013.01); *B60L 2240/547* (2013.01); *H01M 2010/4271* (2013.01); *H01M 2220/20* (2013.01); *H02M 3/1582* (2013.01)

(58) Field of Classification Search
  CPC . H02M 3/1582; H01M 10/441; H01M 10/425
  USPC ........................................................ 320/101
  See application file for complete search history.

(56) References Cited

U.S. PATENT DOCUMENTS

| | | | |
|---|---|---|---|
| 10,056,755 B2 | 8/2018 | Li et al. | |
| 10,277,041 B2* | 4/2019 | Zane et al. | ................ H02J 7/00 |
| 10,298,026 B2* | 5/2019 | Trimboli et al. | ....... H02J 1/102 |
| 2010/0181829 A1 | 7/2010 | Ichikawa et al. | |
| 2011/0025126 A1 | 2/2011 | Brabec | |
| 2012/0175966 A1 | 7/2012 | Nakashima et al. | |

FOREIGN PATENT DOCUMENTS

| | | | |
|---|---|---|---|
| CN | 103296740 | A | 9/2013 |
| CN | 103326439 | A | 9/2013 |
| CN | 104425852 | A | 3/2015 |
| CN | 204832470 | U | 12/2015 |
| CN | 102577020 | B | 1/2016 |
| CN | 105515101 | A | 4/2016 |
| CN | 104253469 | B | 3/2017 |
| CN | 107968446 | A | 4/2018 |
| JP | 2009033785 | A | 2/2009 |
| JP | 2010075032 | A | 4/2010 |
| JP | 2016195530 | A | 11/2016 |
| WO | 2012049963 | A1 | 4/2012 |

OTHER PUBLICATIONS

Machine Translation and Abstract of Chinese Publication No. CN103199580, Jul. 10, 2013, 12 pages.
Machine Translation and Abstract of Chinese Publication No. CN103296740, Sep. 11, 2013, 8 pages.
Machine Translation and Abstract of Chinese Publication No. CN103326439, Sep. 25, 2013, 15 pages.
Machine Translation and Abstract of Chinese Publication No. CN104253469, Dec. 31, 2014, 28 pages.
Machine Translation and Abstract of Chinese Publication No. CN105515101, Apr. 20, 2016, 13 pages.
Machine Translation and Abstract of Chinese Publication No. CN107968446, Apr. 27, 2018, 28 pages.
Machine Translation and Abstract of Chinese Publication No. CN204832470, Dec. 2, 2015, 16 pages.
Machine Translation and Abstract of Japanese Publication No. JP2010075032, Apr. 2, 2010, 6 pages.
Li, Y., et al. "A Module-Integrated Distributed Battery Energy Storage and Management System," XP011616395, IEEE Transactions on Power Electronics, Institute of Electrical and Electronics Engineers, USA, vol. 31, No. 12, Dec. 1, 2016, pp. 8260-8270.
Li, Y., et al., "Evaluation of a module-integrated distributed battery energy storage system," XP032800786, 2015 IEEE Energy Conversion Congress and Exposition (ECCE), IEEE, Sep. 20, 2015, pp. 1351-1358.
Foreign Communication From A Counterpart Application, European Application No. 18794942.5, Extended European Search Report dated Feb. 7, 2020, 9 pages.
Foreign Communication From A Counterpart Application, Chinese Application No. 201710304859.5, Chinese Office Action dated Jul. 16, 2019, 3 pages.
Foreign Communication From A Counterpart Application, Chinese Application No. 201710304859.5, Chinese Search Report dated Jul. 4, 2019, 3 pages.
Foreign Communication From A Counterpart Application, PCT Application No. PCT/CN2018/085068, English Translation of International Search Report dated Jul. 18, 2018, 2 pages.
Foreign Communication From A Counterpart Application, PCT Application No. PCT/CN2018/085068, English Translation of Written Opinion dated Jul. 18, 2018, 3 pages.

* cited by examiner

DISTRIBUTED BATTERY, BATTERY CONTROL METHOD, AND ELECTRIC VEHICLE

CROSS-REFERENCE TO RELATED APPLICATIONS

This application is a continuation of International Patent Application No. PCT/CN2018/085068 filed on Apr. 28, 2018, which claims priority to Chinese Patent Application No. 201710304859.5 filed on May 3, 2017. The disclosures of the aforementioned applications are hereby incorporated by reference in their entireties.

TECHNICAL FIELD

Embodiments of the present disclosure relate to power electronics technologies, in particular, to a distributed battery pack power supply system, a charging control method, and a discharging control method, and especially, to an electric vehicle using the distributed battery pack as a power supply system.

BACKGROUND

With continuous development of automotive technologies, new energy vehicles such as electric vehicles and hybrid electric vehicles are widely used. FIG. 1 is a schematic diagram of a partial structure of a power supply system in a vehicle. As shown in FIG. 1, m electrochemical cells are connected in parallel to form a circuit, a circuit voltage is the same as a voltage of a single electrochemical cell, and a circuit capacity is m times as large as a capacity of the single electrochemical cell. A plurality of circuits are connected in series to form a module group, and n module groups are connected in series to form a battery pack of the power supply system. The battery pack supplies power to a high-voltage load using a relay. A total voltage of the battery pack depends on a total quantity of circuits that are connected in series, and a total quantity of ampere hours depends on a quantity of electrochemical cells that are connected in parallel inside the circuit.

However, it is difficult for the typical serial battery pack power supply system in FIG. 1 to flexibly select a parallel pattern or a serial pattern during charging/discharging. Both the parallel pattern and the serial pattern have technical problems. When a single battery pack or battery group is charged/discharged, a cask effect occurs. To be specific, when one of electrochemical cells reaches a discharging cutoff voltage or a charging cutoff voltage, the entire battery pack or battery group cannot be discharged or charged. More severely, if one of the electrochemical cells fails (for example, because of an internal short circuit, an internal resistance increase, or an excessively high temperature), the entire battery pack or battery group cannot be used. In this case, a plurality of battery packs or battery groups need to be connected in parallel for use. When the plurality of battery packs or battery groups are directly connected in parallel for use, the electrochemical cells first need to be of a same type (a chemical system, a cycle life, a capacity, an internal resistance, and the like), then the electrochemical cells need to have good consistency (even if the electrochemical cells are of a same type, a specific deviation between capacities, internal resistances, or the like may be caused during production, and a smaller deviation indicates better consistency), and finally the battery packs or battery groups need to have a same voltage. All these requirements increase a difficulty in connecting the plurality of battery packs or battery groups in parallel for use. Battery packs or battery groups of different types, poor consistency, or different voltages cannot be directly connected in parallel for use. In other approaches, charging/discharging circuits are added outside the battery packs or battery groups such that the battery packs or battery groups of different types, poor consistency, or different voltages can be indirectly connected in parallel for use.

SUMMARY

Embodiments of the present disclosure provide a distributed battery power supply system, a charging control method, and a discharging control method in order to implement flexible selection and switching between parallel and serial battery charging/discharging.

Two common manners in which a plurality of battery packs or battery groups are connected in parallel for use are as follows. When having a same type, good consistency, and a same voltage, the battery packs or battery groups are directly connected in parallel for use, and when the battery packs or battery groups are of different types, poor consistency, or different voltages, a charging/discharging circuit is added outside each battery pack or battery group, and the battery packs or battery groups are indirectly connected in parallel for use.

According to a first aspect, an embodiment of the present disclosure provides a distributed battery, including a plurality of battery packs. The distributed battery further includes a controller, a bidirectional voltage transformation circuit, a bypass circuit, a charging circuit, and a charging input end. Each battery pack corresponds to one bypass circuit and one bidirectional voltage transformation circuit. In this embodiment of the present disclosure, the bidirectional voltage transformation circuit is also referred to as a bidirectional step-up/step-down module or a bidirectional step-up/step-down circuit. The bypass circuit includes four connection points, a first switching device connects a first connection point and a third connection point to form a circuit that can be enabled or disabled, and a second switching device connects a second connection point and a fourth connection point to form a circuit that can be enabled or disabled. The bidirectional voltage transformation circuit includes four connection points a first connection point, a second connection point, a third connection point, and a fourth connection point, the first connection point and the second connection point are connection points on a side connected to the battery pack, the third connection point and the fourth connection point are connection points on a side connected to the charging circuit, and the bidirectional voltage transformation circuit is configured to perform bidirectional voltage transformation between the battery pack and the charging circuit. A positive electrode of the battery pack is separately connected to the first connection point of the bypass circuit and the first connection point of the bidirectional voltage transformation circuit, a negative electrode of the first battery pack is separately connected to the second connection point of the bypass circuit and the second connection point of the bidirectional voltage transformation circuit, the third connection point of the bypass circuit and the third connection point of the bidirectional voltage transformation circuit are separately connected to a first output end of the charging circuit, and the fourth connection point of the bypass circuit and the fourth connection point of the bidirectional voltage transformation circuit are separately connected to a second output end of the charging circuit. An input end of the charging circuit is connected to the charging input end. The controller is connected to the battery pack, the bidirectional voltage transformation circuit, the bypass circuit, and the charging circuit, and the controller is configured to control an on-off status of the first switching device, an on-off status of the second switching device, and a working status of the bidirectional voltage transformation circuit based on a voltage of the battery pack and a parameter of the battery pack.

In a specific implementation, in the embodiments of the present disclosure, the parameter of the battery pack may include one or more of a chemical system, a capacity of the battery pack, an internal resistance, a cycle life, and the like.

In an implementation of the bidirectional voltage transformation circuit in the first aspect, the bidirectional voltage transformation circuit includes six switching devices and one inductor, a first switch is connected to the first connection point of the bidirectional voltage transformation circuit, one end of a second switch is connected to the second connection point of the bidirectional voltage transformation circuit, one end of a fifth switch is connected to the third connection point of the bidirectional voltage transformation circuit, one end of a sixth switch is connected to the fourth connection point of the bidirectional voltage transformation circuit, the other end of the first switch is connected to one end of a third switch and one end of a first inductor, the other end of the fifth switch is connected to one end of a fourth switch and the other end of the first inductor, and the other end of the second switch, the other end of the third switch, the other end of the fourth switch, and the other end of the sixth switch are connected to each other.

In an implementation of the first aspect, the controller is further configured to determine types of the plurality of battery packs, to be specific, for two of the plurality of battery packs, determine whether chemical systems of the two battery packs are consistent, determine whether capacities of the battery packs are consistent if the chemical systems are consistent, determine whether internal resistances of the battery packs are consistent if the capacities of the battery packs are consistent, determine whether cycle lives of the battery packs are consistent, and determine that the two battery packs are battery packs of a same type if the lives are consistent, or determine that the battery packs are two battery packs of different battery pack types if the two battery packs are inconsistent in any one of the chemical systems, the capacities of the battery packs, the internal resistances, and the cycle lives, where a battery pack with a higher discharge rate is a power-type battery pack, and a battery pack with a lower charge/discharge rate is an energy-type battery pack.

In an implementation of the first aspect, the plurality of battery packs include at least a first battery pack and a second battery pack, and the first battery pack and the second battery pack are of a same type, and the controller is further configured to determine a voltage difference between the first battery pack and the second battery pack, if the voltage difference is less than or equal to a first threshold, when the charging circuit is in a working state, control a first switching device and a second switching device in the bypass circuit connected to the first battery pack to be closed, to enable the circuit, and control a first switching device and a second switching device in the bypass circuit connected to the second battery pack to be closed, to enable the circuit, and control an output current of the charging circuit to be less than or equal to a sum of charging currents of the first battery pack and the second battery pack.

In an implementation of the first aspect, the plurality of battery packs include at least two battery packs a first battery pack and a second battery pack. In practice, the plurality of battery packs in the distributed battery may be battery packs of a same type. For example, the first battery pack and the second battery pack are of a same type. In this implementation, the controller is further configured to determine a voltage difference between the first battery pack and the second battery pack during charging, and if the voltage difference is greater than a first threshold, when the charging circuit is in a working state, control a first switching device and a second switching device in the bypass circuit connected to the first battery pack to be closed to enable the circuit, and control an output current of the charging circuit to be less than or equal to a charging current of the first battery pack to charge the first battery pack, where a voltage of the first battery pack is less than a voltage of the second battery pack, or if the voltage difference between the first battery pack and the second battery pack is less than a second threshold, control a first switching device and a second switching device in the bypass circuit connected to the second battery pack to be closed to enable the circuit, and control an output current of the charging circuit to be less than or equal to a sum of charging currents of the two battery packs.

In a possible implementation of the first aspect, the distributed battery may include a plurality of types of battery packs. For example, the plurality of battery packs include at least an energy-type battery pack and a power-type battery pack. For such a distributed battery, the controller is further configured to determine, during charging, whether a voltage of the energy-type battery pack is less than or equal to a voltage of the power-type battery pack, control a bidirectional voltage transformation circuit corresponding to the energy-type battery pack to work in a step-down mode if the voltage of the energy-type battery pack is less than or equal to the voltage of the power-type battery pack, or if the voltage of the energy-type battery pack is greater than the voltage of the power-type battery pack, control the bidirectional voltage transformation circuit to work in a step-up mode, and control an output current of the bidirectional voltage transformation circuit to be less than or equal to a charging current of the energy-type battery pack, control a first switching device and a second switching device in the bypass circuit corresponding to the power-type battery pack to be closed, to enable the circuit, and after determining a working mode of the bidirectional voltage transformation circuit outside the energy-type battery pack, control the charging circuit to work, and set an output current of the charging circuit to be less than or equal to a sum of an input current of the bidirectional voltage transformation circuit and a charging current of the power-type battery pack.

In a possible implementation of the first aspect, the plurality of battery packs include at least two battery packs, a first battery pack and a second battery pack, and the third connection point and the fourth connection point of the bidirectional voltage transformation circuit are connected to a load of the distributed battery, and the controller is further configured to determine a voltage difference between the first battery pack and the second battery pack, and when the distributed battery is in a discharge state, if the voltage difference is less than or equal to a third threshold, control a first switching device and a second switching device in the bypass circuit connected to the first battery pack to be closed to enable the circuit, and control a first switching device and a second switching device in the bypass circuit connected to the second battery pack to be closed to enable the circuit.

In a possible implementation of the first aspect, the plurality of battery packs include at least two battery packs, a first battery pack and a second battery pack. In practice, the plurality of battery packs in the distributed battery may be battery packs of a same type. The third connection point and the fourth connection point of the voltage transformation circuit are connected to a load of the distributed battery. The controller is configured to determine a voltage difference between the first battery pack and the second battery pack, and when the distributed battery is in a discharge state, if the voltage difference is greater than a third threshold, control a first switching device and a second switching device in the bypass circuit connected to the first battery pack to be closed to enable the circuit and discharge the first battery pack, where a voltage of the first battery pack is greater than a voltage of the second battery pack, or if the voltage difference is less than or equal to a fourth threshold, control a first switching device and a second switching device in the bypass circuit connected to the second battery pack to be closed to enable the circuit.

In a possible implementation of the first aspect, the plurality of battery packs include at least two battery packs. In practice, the plurality of battery packs in the distributed battery may be battery packs of different types. For example, the plurality of battery packs include at least an energy-type battery pack and a power-type battery pack. The controller is configured to determine whether a voltage of the energy-type battery pack is greater than a voltage of the power-type battery pack, if the voltage of the energy-type battery pack is less than or equal to the voltage of the power-type battery pack, control a bidirectional voltage transformation circuit corresponding to the energy-type battery pack to work in a step-up mode, or if the voltage of the energy-type battery pack is greater than the voltage of the power-type battery pack, control a bidirectional voltage transformation circuit corresponding to the energy-type battery pack to work in a step-down mode, and control an input current of the bidirectional voltage transformation circuit to be less than or equal to a discharging current of the energy-type battery pack, and control a first switching device and a second switching device in the bypass circuit connected to the power-type battery pack to be closed, to enable the circuit.

According to a second aspect, an embodiment of the present disclosure further provides a charging control method for a distributed battery, the distributed battery to which the method is applied includes at least a first battery pack and a second battery pack, and the method includes if the first battery pack and the second battery pack are battery packs of a same type, determining whether a voltage difference between the first battery pack and the second battery pack is greater than a first threshold, and if the voltage difference between the first battery pack and the second battery pack is less than or equal to the first threshold, controlling a bypass circuit of the distributed battery to charge the first battery pack and the second battery pack that are connected in parallel, or if the voltage difference between the first battery pack and the second battery pack is greater than the first threshold, controlling a bypass circuit of the distributed battery pack to first charge the first battery pack, where a voltage of the first battery pack is less than a voltage of the second battery pack, and after determining that the voltage difference between the first battery pack and the second battery pack is less than or equal to the second threshold, controlling the bypass circuit of the distributed battery to charge the first battery pack and the second battery pack that are connected in parallel.

In a possible implementation of the second aspect, the method may further include if the first battery pack and the second battery pack are battery packs of different types, the first battery pack is an energy-type battery pack, and the second battery pack is a power-type battery pack, determining whether a voltage of the energy-type battery pack is less than or equal to a voltage of the power-type battery pack, if the voltage of the energy-type battery pack is less than or equal to the voltage of the power-type battery pack, controlling a bidirectional voltage transformation circuit corresponding to the energy-type battery pack to work in a step-down mode, or if the voltage of the energy-type battery pack is greater than the voltage of the power-type battery pack, controlling the bidirectional voltage transformation circuit to work in a step-up mode, and controlling an output current of the bidirectional voltage transformation circuit to be less than or equal to a charging current of the energy-type battery pack, charging the energy-type battery pack, and controlling the bypass circuit of the distributed battery to charge the power-type battery pack and the energy-type battery pack that are connected in parallel.

In a possible implementation of the second aspect, the method may further include determining types of the first battery pack and the second battery pack, to be specific, determining whether chemical systems of the two battery packs are consistent, if the chemical systems are consistent, determining whether capacities of the battery packs are consistent, if the capacities of the battery packs are consistent, determining whether internal resistances of the battery packs are consistent, if the internal resistances are consistent, determining whether cycle lives of the battery packs are consistent, and if the lives are consistent, determining that the two battery packs are battery packs of a same type, or if the two battery packs are inconsistent in any one of the chemical systems, the capacities of the battery packs, the internal resistances, and the cycle lives, determining that the battery packs are two battery packs of different battery pack types, where a battery pack with a higher discharge rate is a power-type battery pack, and a battery pack with a lower charge/discharge rate is an energy-type battery pack.

According to a third aspect, an embodiment of the present disclosure further provides a discharging control method for a distributed battery pack, the distributed battery includes at least a first battery pack and a second battery pack, and the method includes if the first battery pack and the second battery pack are battery packs of a same type, determining a voltage difference between the first battery pack and the second battery pack, and if the voltage difference is less than or equal to a third threshold, controlling the first battery pack and the second battery pack that are connected in parallel to be discharged, or if the voltage difference is greater than a third threshold, controlling the bypass circuit connected to the first battery pack to discharge the first battery pack, where a voltage of the first battery pack is greater than a voltage of the second battery pack, detecting the voltage difference between the first battery pack and the second battery pack, and if the voltage difference is less than or equal to a fourth threshold, controlling the first battery pack and the second battery pack that are connected in parallel to be discharged.

In a possible implementation of the third aspect, the method may further include if the first battery pack and the second battery pack are battery packs of different types, the first battery pack is an energy-type battery pack, and the second battery pack is a power-type battery pack, determining whether a voltage of the energy-type battery pack is greater than a voltage of the power-type battery pack, if the voltage of the energy-type battery pack is less than or equal to the voltage of the power-type battery pack, controlling the energy-type battery pack to be in a working mode in which the energy-type battery pack is discharged after being stepped up, or if the voltage of the energy-type battery pack is greater than the voltage of the power-type battery pack, controlling the energy-type battery pack to be in a working mode in which the energy-type battery pack is discharged after being stepped down, and controlling an input current of a bidirectional voltage transformation circuit to be less than or equal to a discharging current of the energy-type battery pack, and controlling a bypass circuit of the distributed battery to charge the power-type battery pack and the energy-type battery pack that are connected in parallel.

In a possible implementation of the third aspect, the method may further include determining types of the first battery pack and the second battery pack, to be specific, determining whether chemical systems of the two battery packs are consistent, if the chemical systems are consistent, determining whether capacities of the battery packs are consistent, if the capacities of the battery packs are consistent, determining whether internal resistances of the battery packs are consistent, if the internal resistances are consistent, determining whether cycle lives of the battery packs are consistent, and if the lives are consistent, determining that the two battery packs are battery packs of a same type, or if the two battery packs are inconsistent in any one of the chemical systems, the capacities of the battery packs, the internal resistances, and the cycle lives, determining that the battery packs are two battery packs of different battery pack types, where a battery pack with a higher discharge rate is a power-type battery pack, and a battery pack with a lower charge/discharge rate is an energy-type battery pack.

An embodiment of the present disclosure further provides an electric vehicle that includes the foregoing distributed battery system. In addition, the foregoing control methods may be further used for the electric vehicle in the present disclosure. A power part of the electric vehicle includes the distributed battery provided in the embodiments of the present disclosure to serve as a battery system, an in-vehicle charger, a charging connection point, a motor, and a motor controller. The battery system is discharged to supply power to the motor, and the battery system is charged using the in-vehicle charger and the charging connection point. A specific structure of the battery system is described in the embodiments of the present disclosure. The method and the policy provided in the embodiments of the present disclosure may be used as a specific charging/discharging policy.

In the embodiments of the present disclosure, with the bypass circuit and the bidirectional voltage transformation circuit designed in the circuit and through control of a control circuit, a plurality of battery packs or battery groups can be directly connected in parallel or indirectly connected in parallel as required.

BRIEF DESCRIPTION OF DRAWINGS

To describe the technical solutions in some of the embodiments of the present disclosure more clearly, the following briefly introduces the accompanying drawings describing some of the embodiments. The accompanying drawings in the following description show some embodiments of the present disclosure, and a person of ordinary skill in the art may derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

There are two common manners in which a plurality of battery packs or battery groups are connected in parallel for use. In a first manner, when having a same type, good consistency, and a same voltage, the battery packs or battery groups are directly connected in parallel for use. In a second manner, when the battery packs or battery groups are of different types, poor consistency, or different voltages, a charging/discharging circuit is added outside each battery pack or battery group, and the battery packs or battery groups are indirectly connected in parallel for use. Switching cannot be randomly performed between direct parallel connection and indirect parallel connection, and consequently poor compatibility and poor scalability are caused. In the embodiments of the present disclosure, according to a special charging/discharging circuit and a corresponding control policy, the plurality of battery packs or battery groups can be directly connected in parallel or indirectly connected in parallel as required.

Figure 1:
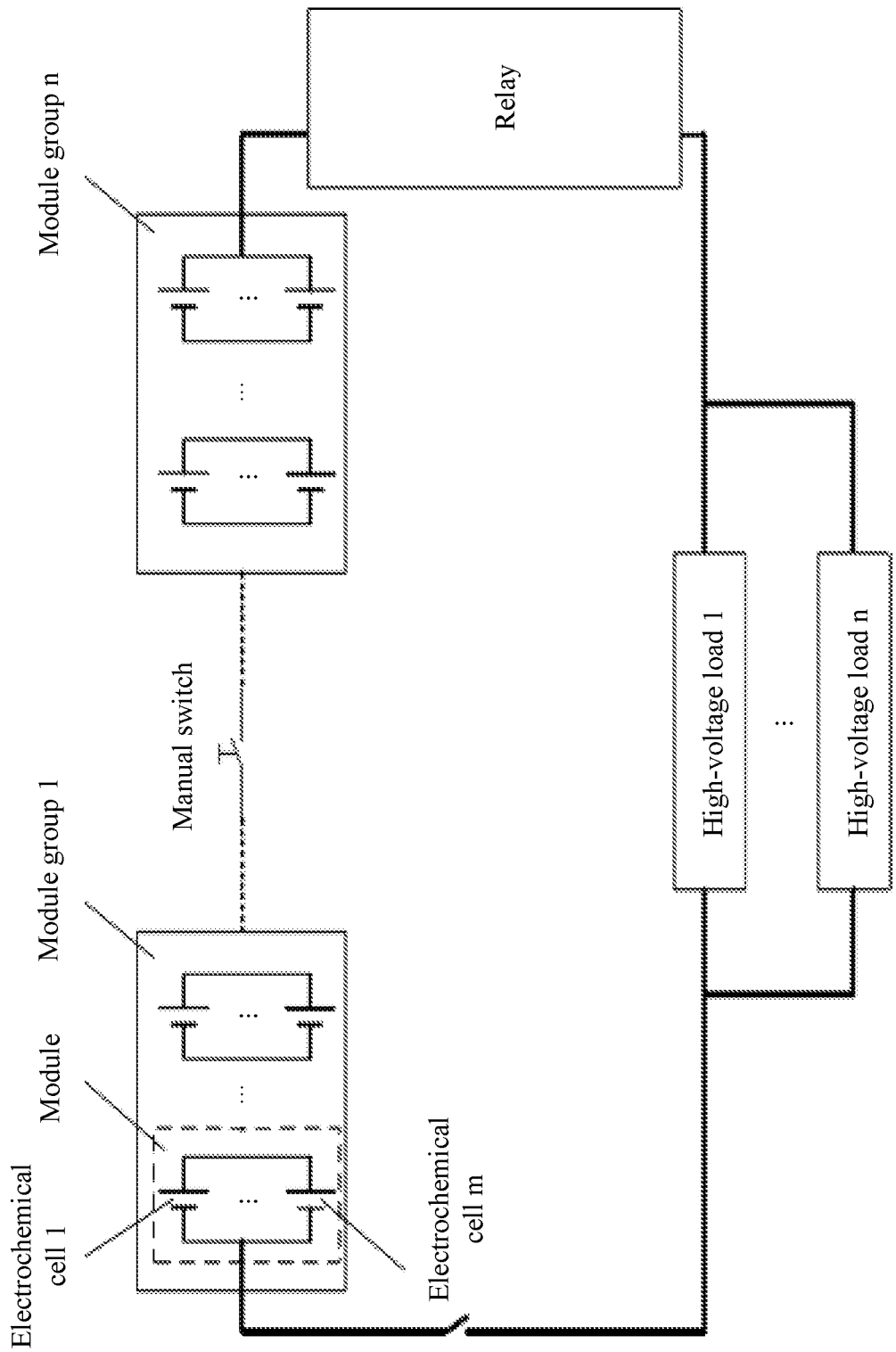
FIG. 1 is a schematic diagram of a partial structure of a power supply system in an electric vehicle.
Figure 2A:
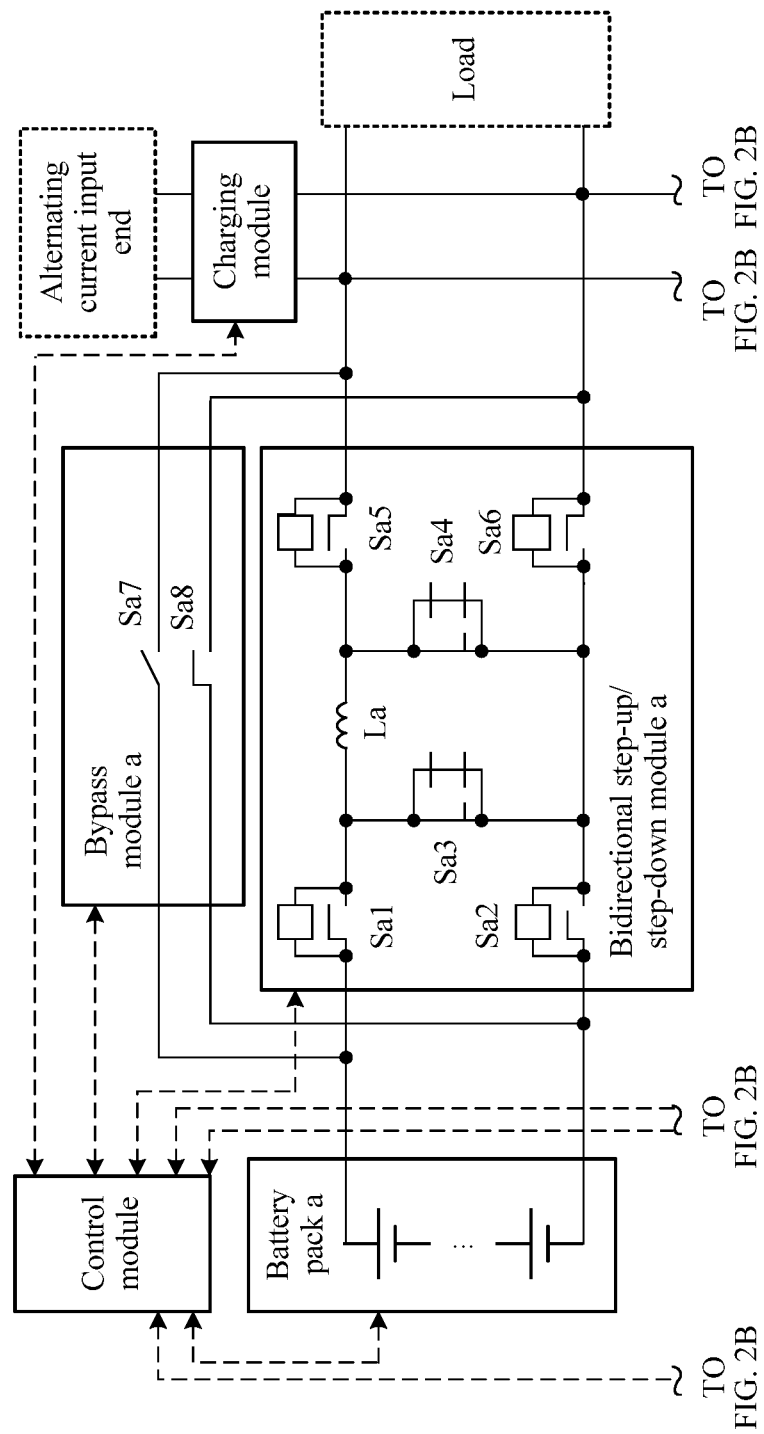
FIG. 2A and FIG. 2B are schematic structural diagrams of an embodiment of a distributed battery pack power supply system according to the present disclosure.
Figure 2B:
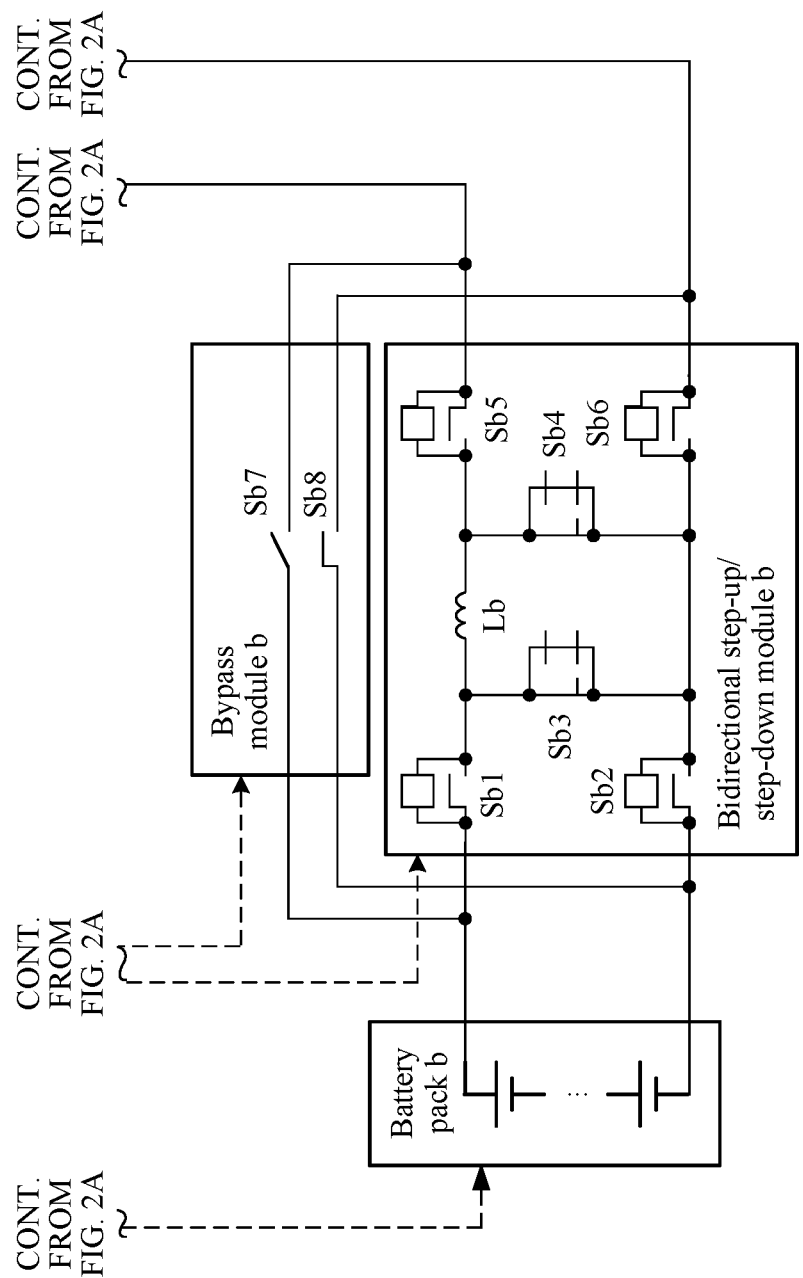

FIG. 2A and FIG. 2B are schematic structural diagrams of an embodiment of a distributed battery pack power supply system according to the present disclosure. As shown in FIG. 2A and FIG. 2B, the distributed battery pack power supply system in this embodiment may include a multi-battery pack charging/discharging system, including two battery packs (a and b), two bidirectional step-up/step-down modules (a and b), two bypass modules (a and b), one charging circuit (designated as charging module), and one control module. Each battery pack corresponds to one bidirectional step-up/step-down module and one bypass module. An example in which there are two battery packs is used as an embodiment for description herein, and more battery packs may be added in a similar manner. When there are more battery packs, a connection relationship between two battery packs is similar to that in this embodiment, and may be added in a manner in this embodiment based on a system requirement.

The battery pack a, and the bidirectional step-up/step-down module a and the bypass module a that are corresponding to the battery pack a are used as an example for description. Each bidirectional step-up/step-down module has four connection points, and each bypass module also has four connection points. The bypass module a is also referred to as a first bypass module, the battery pack a is also referred to as a first battery pack, the bidirectional step-up/step-down module a is also referred to as a first bidirectional step-up/step-down module, and the battery pack b is also referred to as a second battery pack. A first connection point of the first bypass module is connected to a first connection point of the first bidirectional step-up/step-down module, and both the first connection point of the first bypass module and the first connection point of the first bidirectional step-up/step-down module are connected to a positive electrode of the first battery pack a. A second connection point of the first bypass module is connected to a second connection point of the first bidirectional step-up/step-down module, and both the second connection point of the first bypass module and the second connection point of the first bidirectional step-up/step-down module are connected to a negative electrode of the first battery pack a. A third connection point of the first bypass module is connected to a third connection point of the first bidirectional step-up/step-down module, and both the third connection point of the first bypass module and the third connection point of the first bidirectional step-up/step-down module are connected to a positive electrode of a load and an output positive electrode of the charging circuit. A fourth connection point of the first bypass module is connected to a fourth connection point of the first bidirectional step-up/step-down module, and both the fourth connection point of the first bypass module and the fourth connection point of the first bidirectional step-up/step-down module are connected to a negative electrode of the load and an output negative electrode of the charging circuit.

The control module is connected to the two battery packs (a and b), the two bidirectional step-up/step-down modules (a and b), the two bypass modules (a and b), and the one charging circuit. Each bidirectional step-up/step-down module includes six switches and one inductor. The bidirectional step-up/step-down module a corresponding to the battery pack a is used as an example for description. One end of a first switch Sa1 is connected to the positive electrode of the first battery pack. One end of a second switch Sa2 is connected to the negative electrode of the first battery pack. One end of a fifth switch Sa5 is connected to the positive electrode of the load and the output positive electrode of the charging circuit. One end of a sixth switch Sa6 is connected to the negative electrode of the load and the output negative electrode of the charging circuit. The other end of the first switch Sa1 is connected to one end of a third switch Sa3 and one end of a first inductor La. The other end of the fifth switch Sa5 is connected to one end of a fourth switch Sa4 and the other end of the first inductor La. The other end of the second switch Sa2, the other end of the third switch Sa3, the other end of the fourth switch Sa4, and the other end of the sixth switch Sa6 are connected to each other. Each bypass module includes two switches. The bypass module a corresponding to the first battery pack, namely, the battery pack a is used as an example. One end of a seventh switch Sa1 is connected to the positive electrode of the first battery pack. One end of an eighth switch Sa8 is connected to the negative electrode of the first battery pack. The other end of the seventh switch Sa1 is connected to the positive electrode of the load and the output positive electrode of the charging circuit. The other end of the eighth switch Sa8 is connected to the negative electrode of the load and the output negative electrode of the charging circuit.

In an implementation, the switches in the bidirectional step-up/step-down module and the bypass module each may be one or more of a metal-oxide semiconductor field-effect transistor (MOSFET), an insulated-gate bipolar transistor (IGBT), a relay, or a contactor. When the bidirectional step-up/step-down module is in a working state, if the bidirectional step-up/step-down module is in a step-up mode, the inductor La stores energy, S1, S2, and S4 are turned on, and S3, S5, and S6 are turned off, the inductor La releases energy, S1, S2, S5, and S6 are turned on, and S3 and S4 are turned off. If the bidirectional step-up/step-down module is in a step-down mode, the inductor stores energy, S1, S2, S5, and S6 are turned on, and S3 and S4 are turned off, or the inductor La releases energy, S3, S5, and S6 are turned on, and S1, S2, and S4 are turned off. S1 herein refers to Sa1 and Sb1, and the like.

In this embodiment of the present disclosure, because six switching devices are disposed in a bidirectional step-up/step-down module, when a positive electrode of a battery pack is connected to a negative electrode of an output connection point of the bidirectional step-up/step-down module and a negative electrode of the battery pack is connected to a positive electrode of the output connection point of the bidirectional step-up/step-down module, there is no risk of a direct short circuit caused by a body diode of a switching transistor inside a charging/discharging circuit. Therefore, a reverse polarity protection function is implemented.

Figure 3:
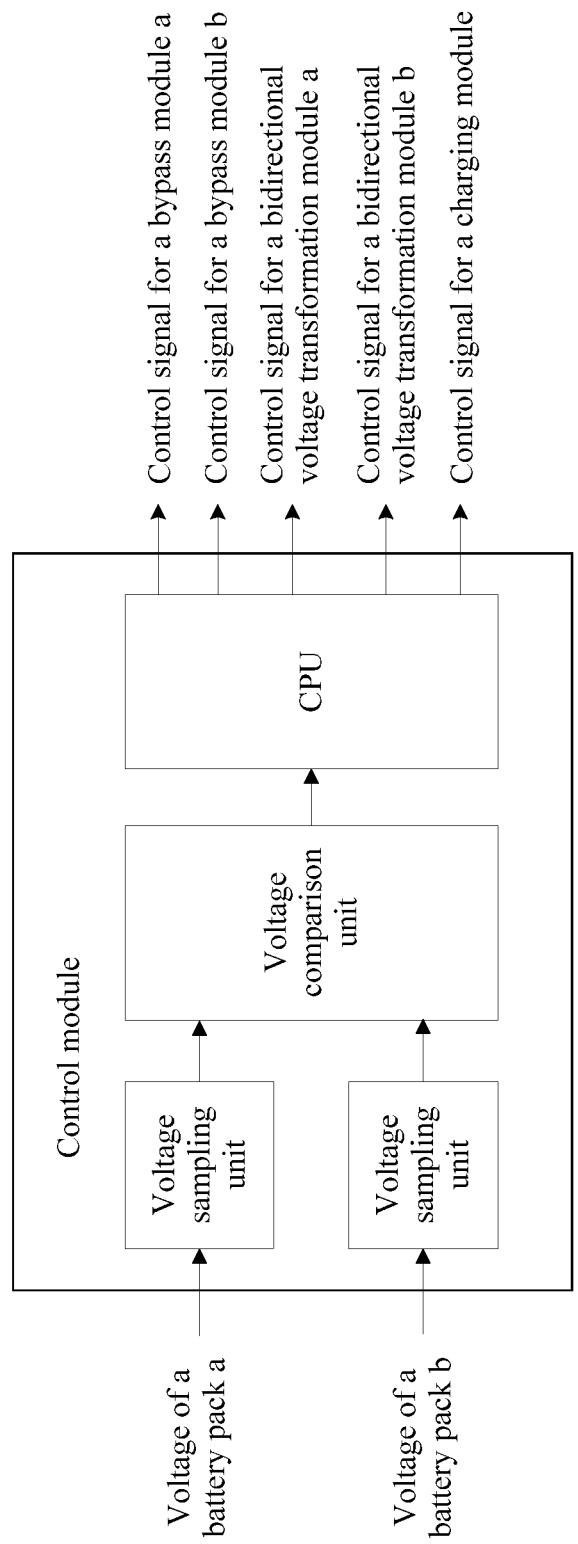
FIG. 3 is a schematic structural diagram of a control module according to an embodiment of the present disclosure.

In a specific implementation, in the embodiments, the control module is shown in FIG. 3. The control module includes a voltage sampling unit, and each battery pack corresponds to one voltage sampling unit. For example, a voltage of the first battery pack a and a voltage of the second battery pack b may be detected by respective corresponding voltage sampling units. The control module further includes a voltage comparison unit. After voltages of battery packs are sampled, the voltage comparison unit performs comparison, and outputs a comparison result to a processor (i.e., central processing unit (CPU)). The CPU is a device that has a signal processing and calculation capability. The CPU outputs a control signal to each battery pack based on a signal obtained from the voltage comparison unit. A bypass module control signal that can be used to control a bypass module of each battery pack is used to control closing and opening of each switching device in the bypass module. The CPU outputs a bidirectional voltage transformation module control signal of each battery pack to control closing and opening of each switching device in a bidirectional step-up/step-down module corresponding to each battery pack. The CPU may further output a charging circuit control signal, to control working of the charging circuit.

Figure 4:
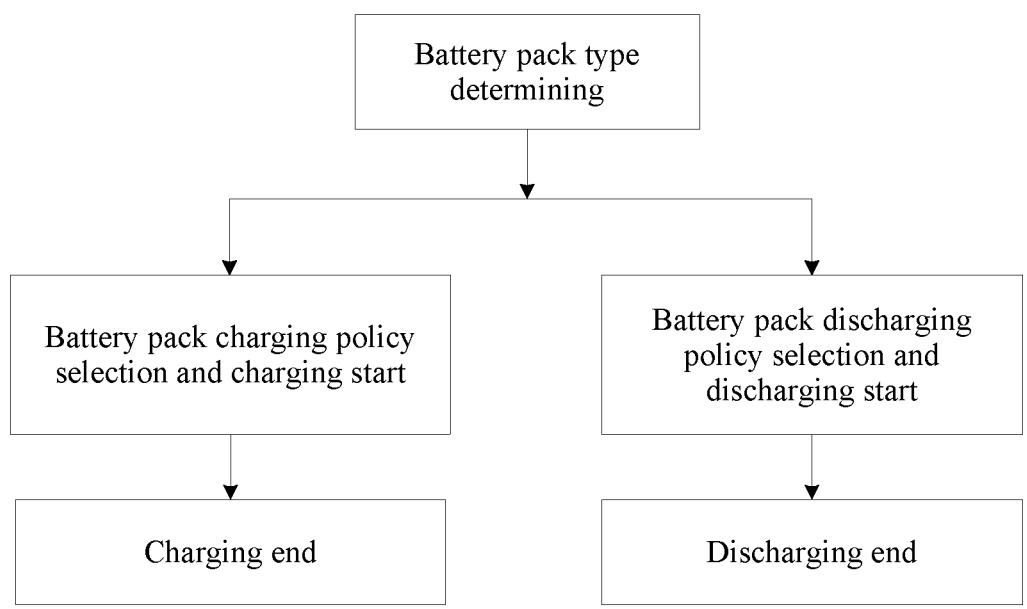
FIG. 4 is an overall flowchart of a control policy according to an embodiment of the present disclosure.

In the foregoing distributed battery pack application, the control module controls the battery packs. In a specific embodiment, an overall control policy procedure includes five phases, battery pack type determining, battery pack charging policy selection and charging start, charging end, battery pack discharging policy selection and discharging start, and discharging end. An overall control policy flowchart is shown in FIG. 4. A type of each battery pack such as the first battery pack and the second battery pack in the distributed battery pack is first determined. A battery pack charging policy or a battery pack discharging policy is selected based on a result of determining whether the first battery pack and the second battery pack are battery packs of a same type. According to the selected policy, a charging/discharging operation is performed on the battery packs, and a charging/discharging end condition or time is controlled.

Figure 5:
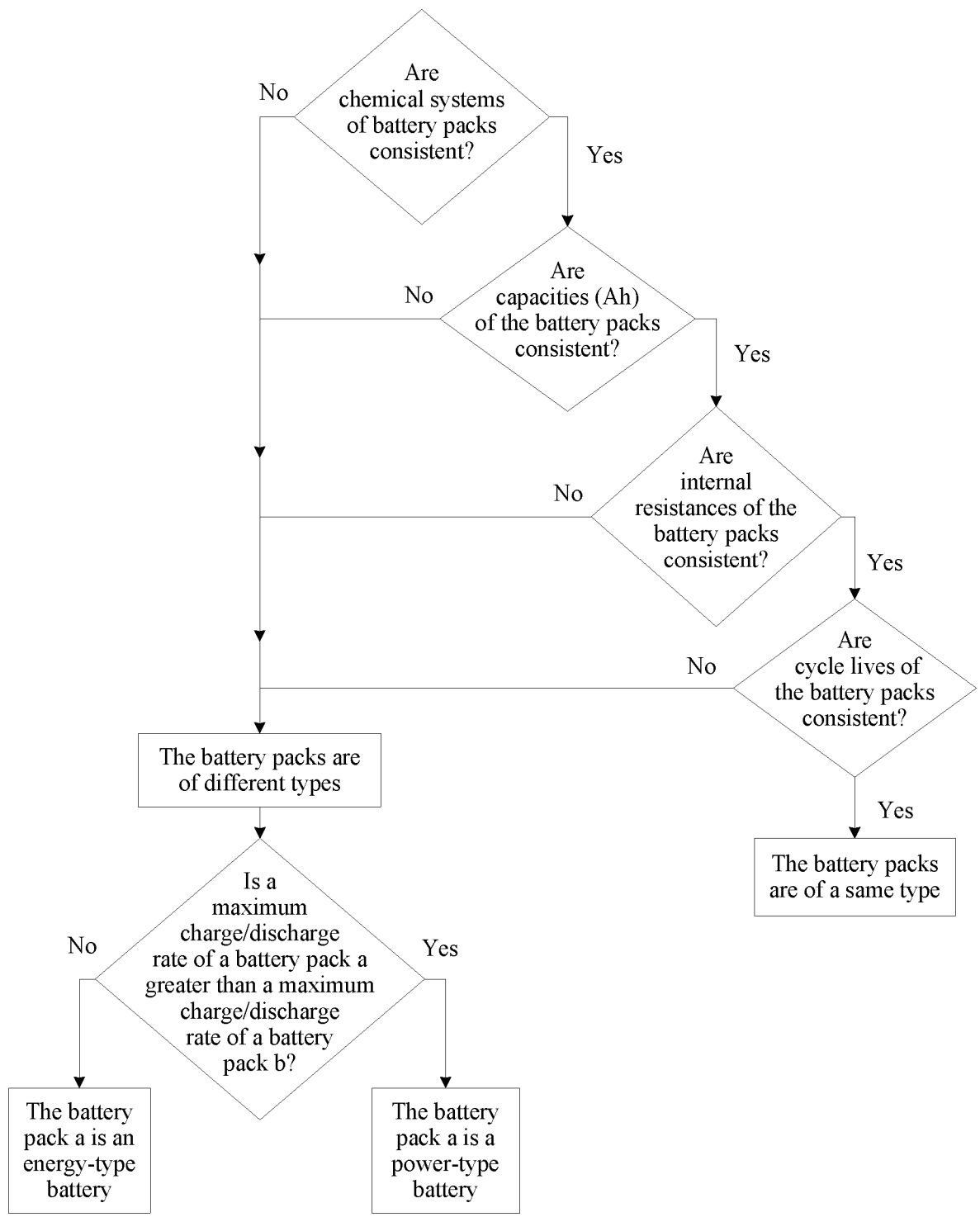
FIG. 5 is a flowchart of determining a type of a battery pack according to an embodiment of the present disclosure.

As shown in FIG. 5, a battery pack type determining procedure is described in a possible implementation. Whether chemical systems of battery packs are consistent is first determined. If the chemical systems are consistent, whether capacities (in units of ampere hours (Ah)) of the battery packs are consistent is determined. If the capacities are consistent, whether internal resistances of the battery packs are consistent is determined. If the internal resistances are consistent, whether cycle lives of the battery packs are consistent is determined. If the cycle lives are consistent, it is determined that the two battery packs are of a same type. It is determined that the two battery packs are of different types, provided that the two battery packs are inconsistent in any one of the chemical systems, the capacities, the internal resistances, and the cycle lives. If the battery packs are of different types, charge/discharge rates of the two battery packs are compared. A battery pack with a higher charge/discharge rate is determined as a power-type battery pack, and a battery pack with a lower charge/discharge rate is determined as an energy-type battery pack. It should be noted that in the embodiments of the present disclosure, when whether parameters are consistent is determined, in addition to that the parameters with an identical numerical value are consistent, the parameters having a difference that falls within a specific range may also be considered to be consistent. A specific allowable difference may vary with a battery application scenario. For example, for some large-capacity battery packs, capacities having a difference that falls within a range of 1 Ah may be considered to be consistent. For some relatively small-capacity battery packs, only capacities having a difference that falls within a range of 0.1 Ah may be considered to be consistent. An example is used for description herein. It should be noted that "consistent" herein means that an error of a numeric value in an engineering sense is allowed, or an error meeting a requirement of an overall system quality parameter is allowed.

Figure 6:
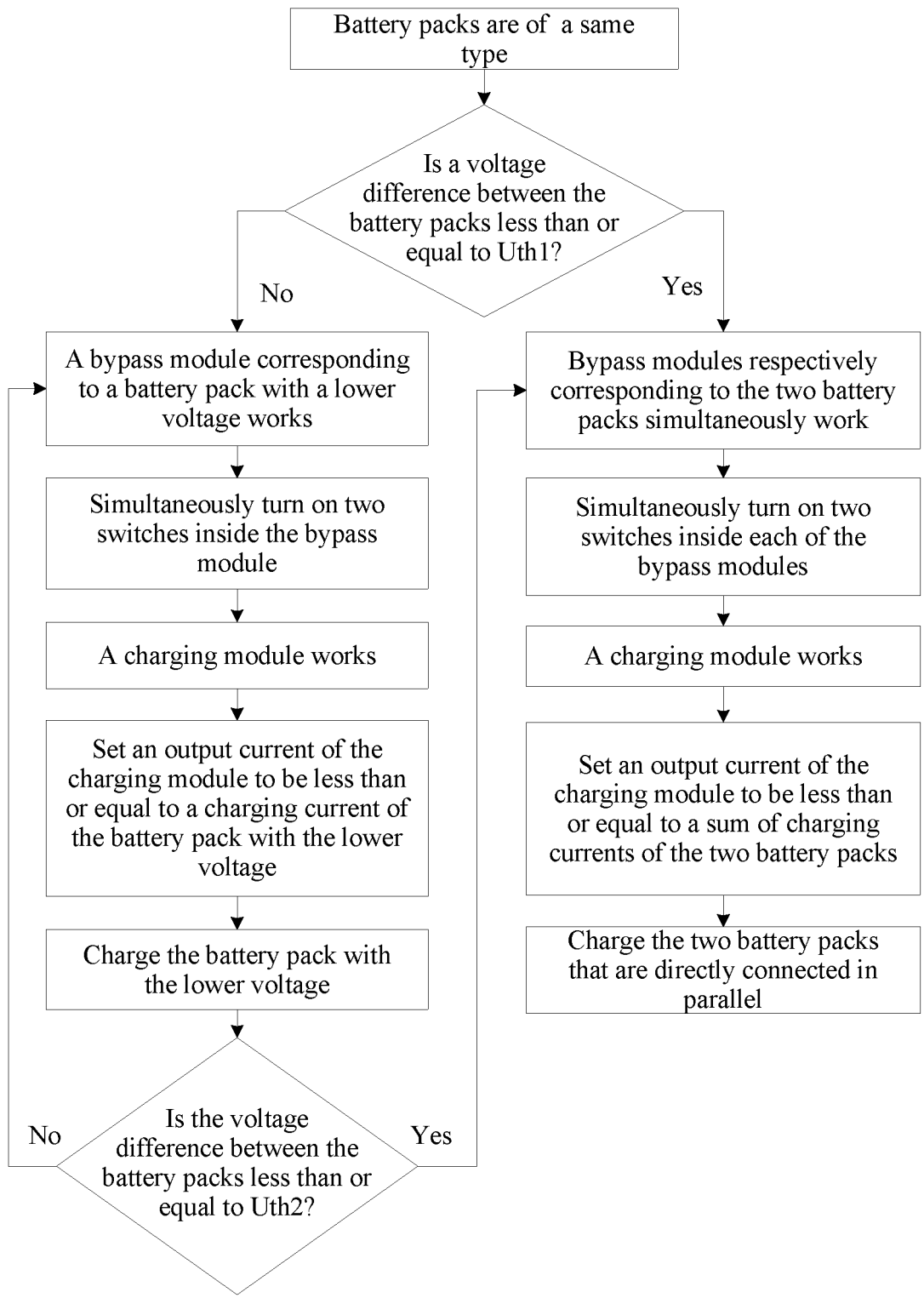
FIG. 6 is a flowchart of selecting a battery pack charging policy according to an embodiment of the present disclosure.

As shown in FIG. 6, in a possible implementation, a battery pack charging policy selection procedure when battery packs are of a same type is described. When the battery packs are of a same type, a voltage difference between the two battery packs is first calculated. If an absolute value of the voltage difference is less than or equal to a first threshold Uth1 (for example, 5 volts (V)), bypass modules respectively corresponding to the two battery packs simultaneously work, that is, two switches inside each of the two bypass modules are simultaneously turned on. Then, a charging circuit works, and an output current of the charging circuit is set to be less than or equal to a sum of charging currents of the two battery packs. Finally, the two battery packs are directly connected in parallel for charging. If an absolute value of the voltage difference is greater than a first threshold Uth1, a bypass module corresponding to a battery pack with a lower voltage works, that is, two switches inside the bypass module are simultaneously turned on. Then, a charging circuit works, and an output current of the charging circuit is set to be less than or equal to a charging current of the battery pack with the lower voltage. The battery pack with the lower voltage starts to be charged, and the voltage difference between the two battery packs is continuously monitored during charging. If the absolute value of the voltage difference is less than or equal to a second threshold Uth2 (for example, 3 V), bypass modules respectively corresponding to the two battery packs simultaneously work, that is, two switches inside each of the two bypass modules are simultaneously turned on, and the output current of the charging circuit is set to be less than or equal to a sum of charging currents of the two battery packs. Finally, the two battery packs are directly connected in parallel for charging.

Figure 7:
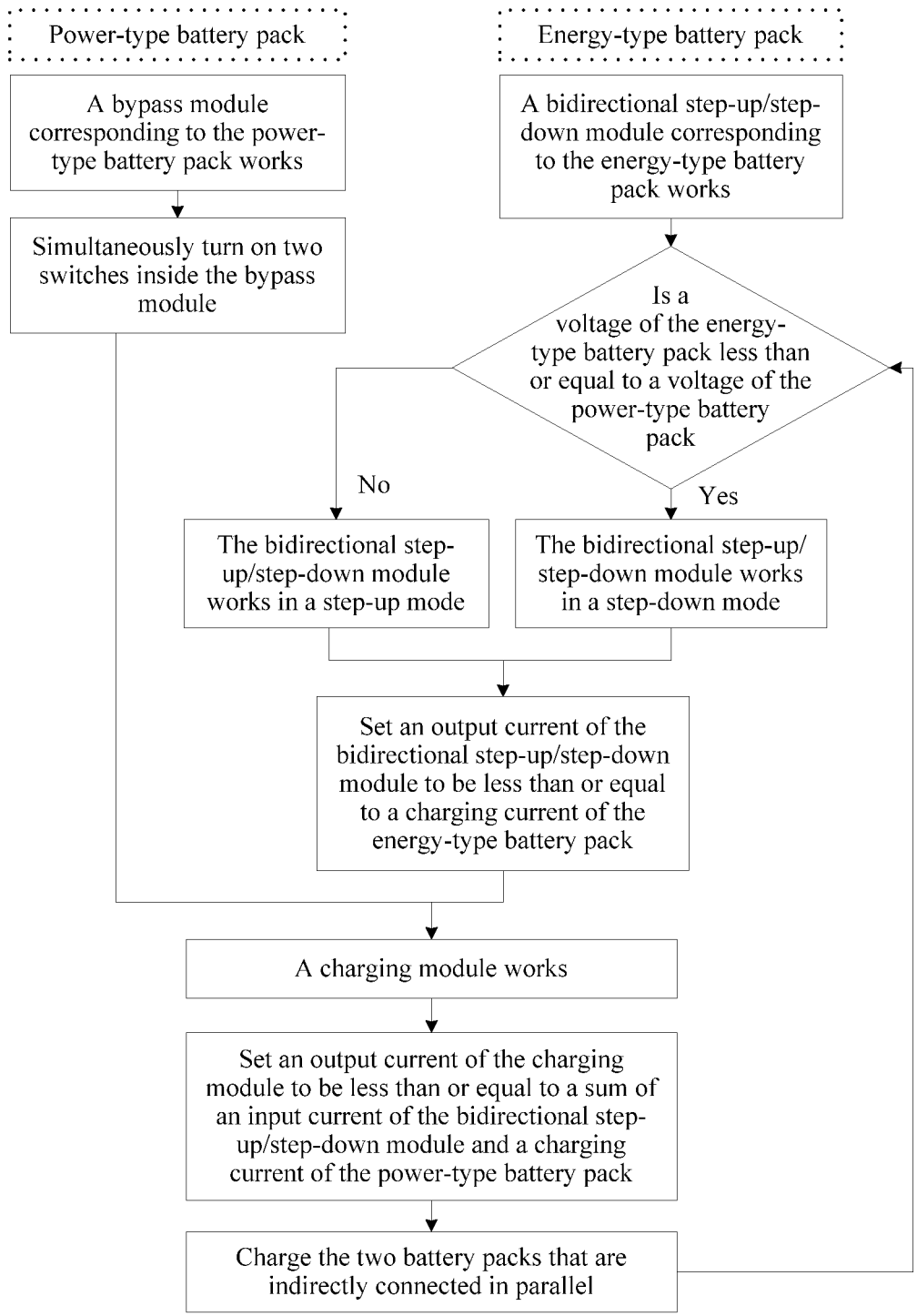
FIG. 7 is a flowchart of selecting another battery pack charging policy according to an embodiment of the present disclosure.

As shown in FIG. 7, in a possible implementation, a battery pack charging policy selection procedure when battery packs are of different types is described. A bidirectional step-up/step-down module corresponding to an energy-type battery pack works. If a voltage of the energy-type battery pack is less than or equal to a voltage of a power-type battery pack, the bidirectional step-up/step-down module is set to work in a step-down mode. If a voltage of the energy-type battery pack is greater than a voltage of a power-type battery pack, the bidirectional step-up/step-down module is set to work in a step-up mode. In both the step-up mode and the step-down mode, an output current of the bidirectional step-up/step-down module is set to be less than or equal to a charging current of the energy-type battery pack. A bypass module corresponding to the power-type battery pack works, and two switches inside the bypass module are simultaneously turned on. After a working mode of the bidirectional step-up/step-down module outside the battery pack is determined, a charging circuit is controlled to work, and an output current of the charging circuit is set to be less than or equal to a sum of an input current of the bidirectional step-up/step-down module and a charging current of the power-type battery pack. Finally, the two battery packs are indirectly connected in parallel for charging. In a specific example, the bypass module corresponding to the power-type battery pack works, the switching devices of the bypass module are simultaneously in an on state, and the bidirectional step-up/step-down module corresponding to the energy-type battery pack works. If the voltage of the energy-type battery pack is less than or equal to the voltage of the power-type battery pack, the bidirectional step-up/step-down module works in the step-down mode. If the voltage of the energy-type battery pack is greater than the voltage of the power-type battery pack, the bidirectional step-up/step-down module works in the step-up mode. When the output current of the bidirectional step-up/step-down module is set to be less than or equal to the charging current of the energy-type battery pack, the charging circuit starts to work, and the output current of the charging circuit is set to be less than or equal to the sum of the input current of the bidirectional step-up/step-down module and the charging current of the power-type battery pack. Finally, the two battery packs are indirectly connected in parallel for charging.

In an actual implementation, when battery packs are directly connected in parallel for charging, whether to end a charging procedure is determined. When the two battery packs are directly connected in parallel for charging, a voltage of each of the battery packs is continuously monitored. If the voltage is greater than a saturation threshold (for example, 400 V), a charging circuit is controlled to stop working, and two bypass modules are controlled to stop working, that is, two switches inside each of the two bypass modules are simultaneously turned off. Finally, charging of the battery packs stops.

In an actual possible implementation, a charging end procedure when an energy-type battery pack is charged is as follows. A voltage of the battery pack is continuously monitored. If the voltage is greater than a saturation threshold Uth3 (for example, 400 V), a bidirectional step-up/step-down module is controlled to stop working. Finally, charging of the energy-type battery pack stops.

In an actual possible implementation, a charging end procedure when a power-type battery pack is charged is as follows. A voltage of the battery pack is continuously monitored. If the voltage is greater than a saturation threshold (for example, 400 V), a bypass module is controlled to stop working, that is, two switches inside the bypass module are simultaneously turned off. Finally, charging of the power-type battery pack stops.

Figure 8:
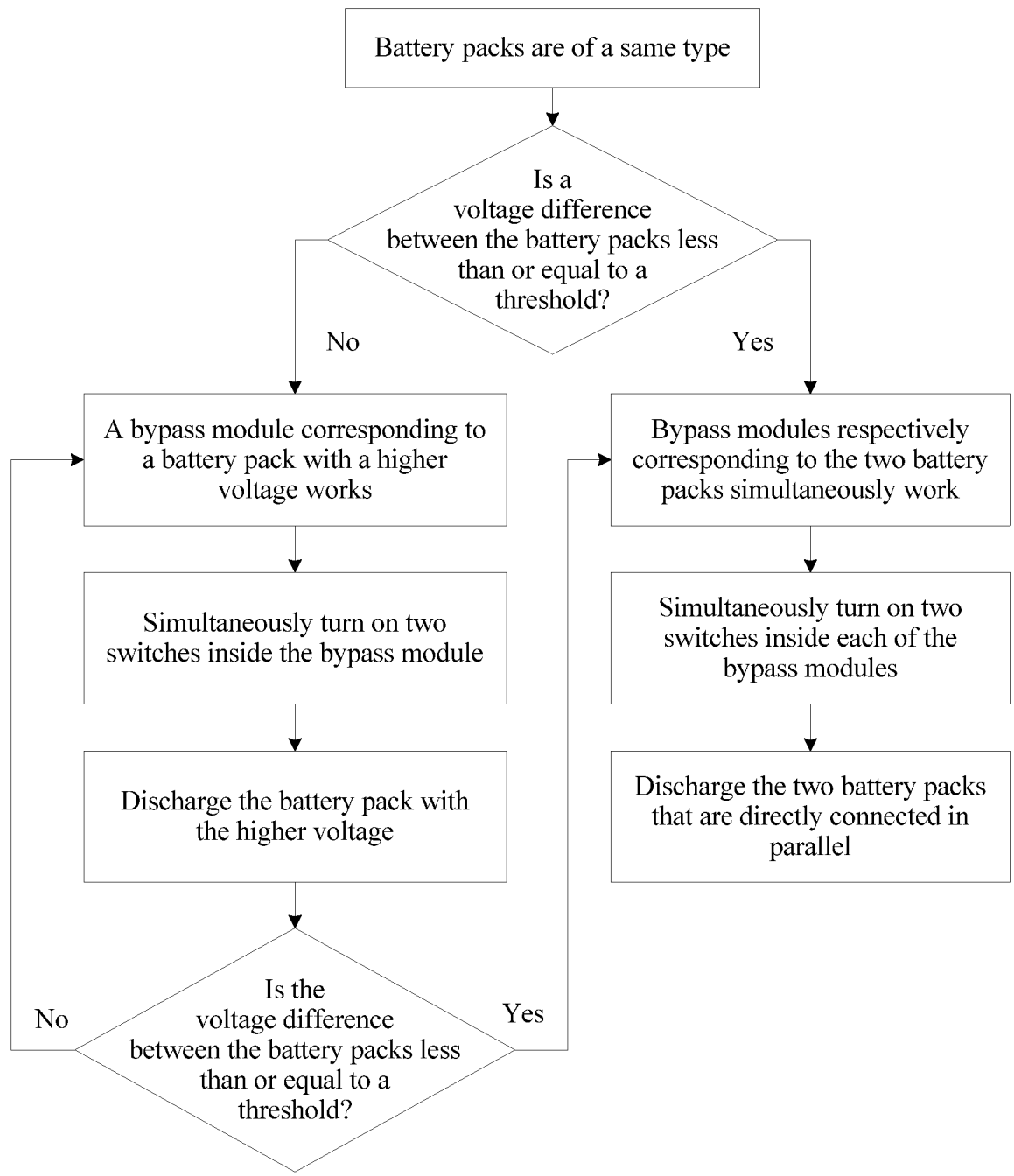
FIG. 8 is a flowchart of determining a battery pack discharging policy according to an embodiment of the present disclosure.

In an actual possible implementation, a battery pack discharging policy determining procedure is shown in FIG. 8. When battery packs are of a same type, a voltage difference between the two battery packs is first calculated. If an absolute value of the voltage difference is less than or equal to a third threshold Uth3 (for example, 5 V), bypass modules respectively corresponding to the two battery packs simultaneously work, that is, two switches inside each of the two bypass modules are simultaneously turned on. Finally, the two battery packs are directly connected in parallel for discharging. If an absolute value of the voltage difference is greater than a third threshold Uth3, a bypass module corresponding to a battery pack with a higher voltage works, that is, two switches inside the bypass module are simultaneously turned on. Then, the battery pack with the higher voltage starts to be discharged, and the voltage difference between the two battery packs is continuously monitored during discharging. In this case, a battery pack with a lower voltage does not work, and does not supply power to a load. If the absolute value of the voltage difference is less than or equal to a fourth threshold Uth4 (for example, 3 V), bypass modules respectively corresponding to the two battery packs simultaneously work, that is, two switches inside each of the two bypass modules are simultaneously turned on. Finally, the two battery packs are directly connected in parallel for discharging. In a specific embodiment, if the two battery packs, for example, a battery pack a and a battery pack b, are of a same type, whether the voltage difference between the two battery packs is less than or equal to the third threshold is determined. If the voltage difference between the two battery packs is less than or equal to the third threshold, the bypass modules respectively corresponding to the two battery packs, namely, the battery pack a and the battery pack b simultaneously work, that is, the two switches inside each of the bypass modules are simultaneously turned on. The two battery packs are directly connected in parallel for discharging. If the voltage difference between the two battery packs is greater than the third threshold, the bypass module corresponding to the battery pack with the higher voltage works, that is, the bypass module corresponding to the battery pack with the higher voltage in the battery pack a and the battery pack b works, and the battery pack with the higher voltage is discharged. Whether the voltage difference between the two battery packs is less than or equal to the fourth threshold is continuously detected. If the voltage difference between the two battery packs is less than or equal to the fourth threshold, the bypass modules respectively corresponding to the two battery packs, namely, the battery pack a and the battery pack b simultaneously work. If the voltage difference between the two battery packs is greater than the fourth threshold, only the battery pack with the higher voltage is discharged.

Figure 9:
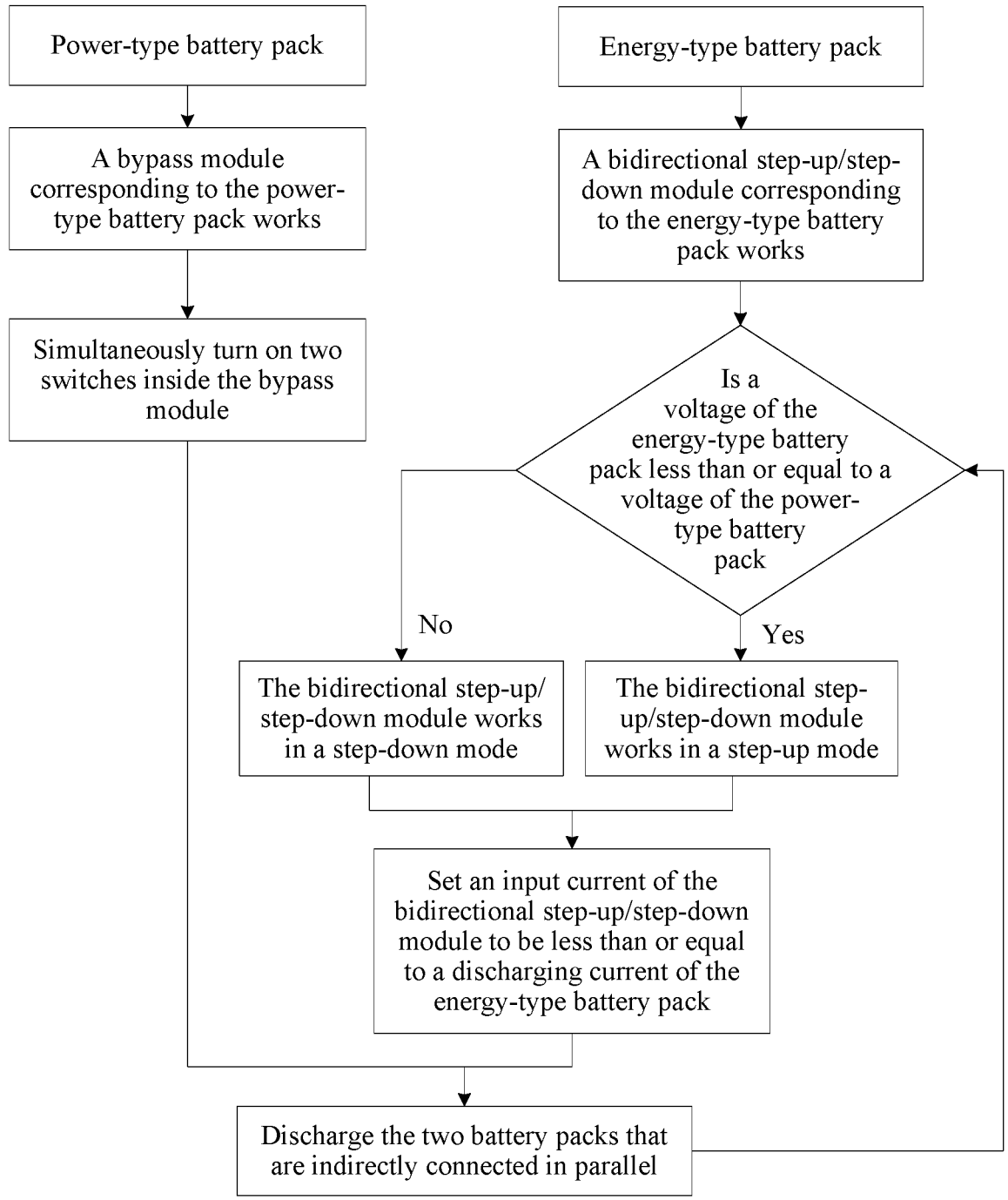
FIG. 9 is a flowchart of determining another battery pack discharging policy according to an embodiment of the present disclosure.

In an actual possible implementation, a battery pack discharging policy determining procedure is shown in FIG. 9. When battery packs are of a different type, a bidirectional step-up/step-down module corresponding to an energy-type battery pack works. If a voltage of the energy-type battery pack is less than or equal to a voltage of a power-type battery pack, the bidirectional step-up/step-down module is set to work in a step-up mode. If a voltage of the energy-type battery pack is greater than a voltage of a power-type battery pack, the bidirectional step-up/step-down module is set to work in a step-down mode. In both the step-up mode and the step-down mode, an input current of the bidirectional step-up/step-down module is set to be less than or equal to a discharging current of the energy-type battery pack. A bypass module corresponding to the power-type battery pack works, and two switches inside the bypass module are simultaneously turned on. After a working mode of the bidirectional step-up/step-down module outside the battery pack is determined, the two battery packs are indirectly connected in parallel for discharging.

In a possible implementation, how to end a discharging procedure is described. When two battery packs are directly connected in parallel for discharging, a voltage of each of the battery packs is continuously monitored. If the voltage is less than a low-voltage threshold (for example, 300 V), two bypass modules are controlled to stop working, that is, two switches inside each of the two bypass modules are simultaneously turned off. Finally, discharging of the battery packs stops. Further, when an energy-type battery pack is discharged, a voltage of the battery pack is continuously monitored. If the voltage is greater than a specific threshold (for example, 300 V), a bidirectional step-up/step-down module is controlled to stop working. Finally, discharging of the energy-type battery pack stops. When a power-type battery pack is discharged, a voltage of the battery pack is continuously monitored. If the voltage is greater than a low-voltage threshold (for example, 300 V), a bypass module is controlled to stop working, that is, two switches inside the bypass module are simultaneously turned off. Finally, discharging of the power-type battery pack stops.

Figure 10:
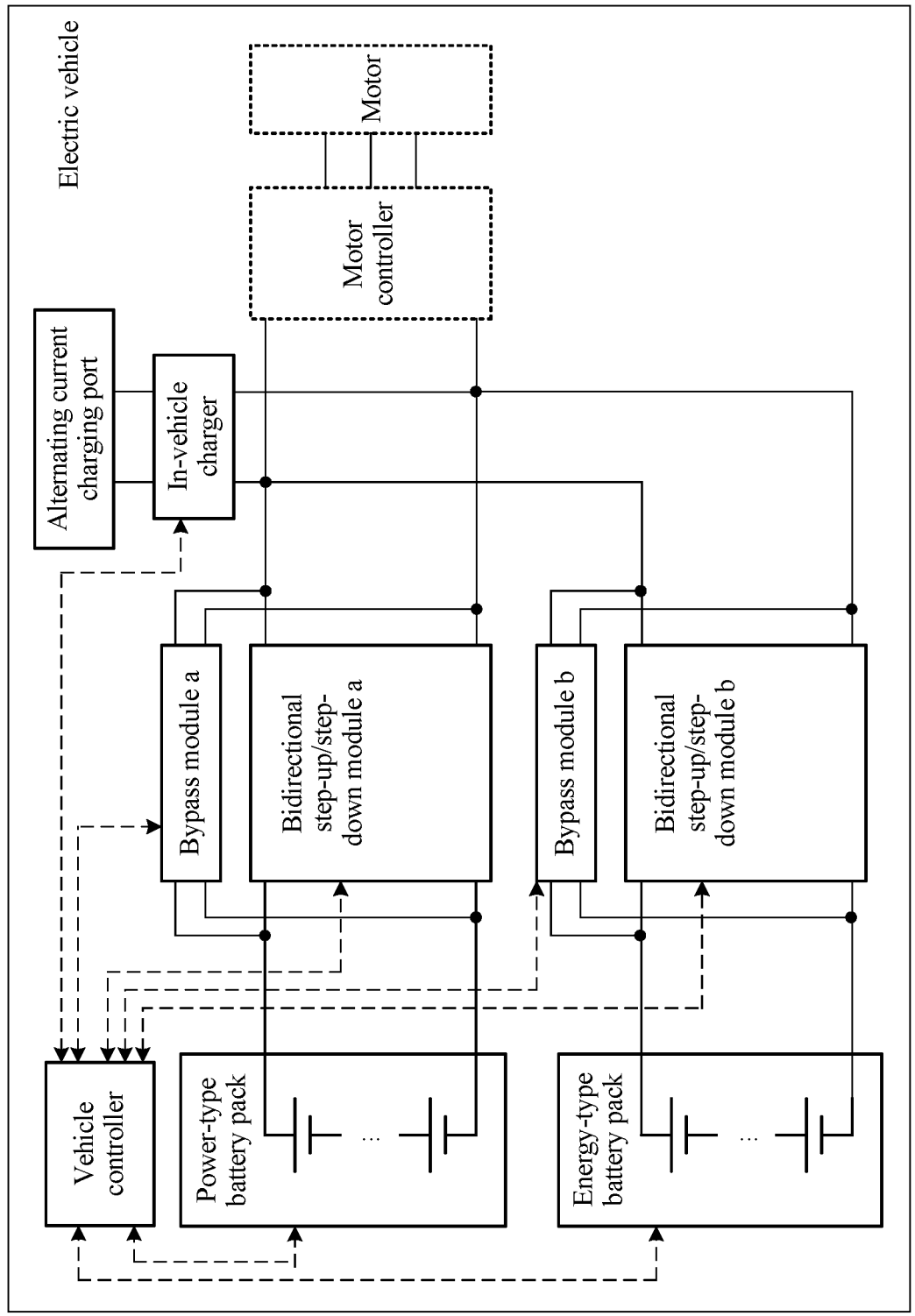
FIG. 10 is a schematic structural diagram of a power part of an electric vehicle according to an embodiment of the present disclosure.

The present disclosure further provides an embodiment of an electric vehicle having a distributed battery pack. Referring to FIG. 10, the electric vehicle includes a distributed battery, an in-vehicle charger, a motor, and a motor controller. The distributed battery is charged using the in-vehicle charger, and the in-vehicle charger obtains external power using a charging connection point (an alternating current charging connection point). The distributed battery supplies power to the motor of the electric vehicle, the motor may be controlled by the motor controller when obtaining power from the distributed battery, and the motor provides power for the electric vehicle. In a manner, a first battery pack a may be a power-type battery pack, and a second battery pack b may be an energy-type battery pack. In a possible case, for example, when the electric vehicle is charged, a bypass module a of the first battery pack a serving as the power-type battery pack works and a bypass module b of the second battery pack serving as the energy-type battery pack does not work, according to a charging control policy. A bidirectional step-up/step-down module b of the second battery pack serving as the energy-type battery pack works, and a bidirectional step-up/step-down module a of the first battery pack serving as the power-type battery pack does not work. The in-vehicle charger obtains an external power supply using the alternating current charging connection point. The in-vehicle charger provides output to directly charge the power-type battery pack using the bypass module of the power-type battery pack. The in-vehicle charger provides output to charge the energy-type battery pack using the bidirectional step-up/step-down module b. For other policy selection and circuit working modes when the two battery packs are charged, refer to the descriptions in the foregoing embodiments. When the electric vehicle travels, the distributed battery pack is in a discharge state. If the first battery pack a is the power-type battery pack and the second battery pack b is the energy-type battery pack, the bypass module a of the first battery pack a serving as the power-type battery pack works and the bypass module b of the second battery pack b serving as the energy-type battery pack does not work, according to a discharging control policy. The bidirectional step-up/step-down module b of the second battery pack b serving as the energy-type battery pack works, and the bidirectional step-up/step-down module a of the first battery pack a serving as the power-type battery pack does not work. The power-type battery pack directly supplies power to the motor using the bypass module and the motor controller. The energy-type battery pack supplies power to the motor using the bidirectional step-up/step-down module and the motor controller. For other possible policy selection and circuit working modes when the two battery packs are discharged, refer to the descriptions in the foregoing embodiments.

The distributed battery in the embodiments of the present disclosure may also be referred to as a multi-battery pack battery. Using the foregoing charging/discharging circuit that includes the bypass module and the bidirectional step-up/step-down module and according to the control policy provided in the embodiments, a plurality of battery packs or battery groups can be directly connected in parallel or indirectly connected in parallel as required.

What is claimed is:

1. A distributed battery pack power supply system, configured to get charged from a charging input end, and the distributed battery pack power supply system comprising:
   a first battery pack, comprising:
      a positive electrode; and
      a negative electrode;
   a charging circuit, comprising:
      an input end coupled to the charging input end;
      a first output end; and
      a second output end;
   a first bypass circuit, coupled between the first battery pack and the charging circuit, the first bypass circuit comprising:
      a first connection point coupled to the positive electrode of the first battery pack;
      a second connection point coupled the negative electrode of the first battery pack;
      a third connection point coupled to the first output end of the charging circuit;
      a fourth connection point coupled to the second output end of the charging circuit;
      a first switching device configured to couple the first connection point and the third connection point to form a first circuit that is enabled or disabled; and
      a second switching device configured to couple the second connection point and the fourth connection point to form a second circuit that is enabled or disabled;
   a first bidirectional voltage transformation circuit, coupled between the first battery pack and the charging circuit, and the first bidirectional voltage transformation circuit comprising:
      a fifth connection point coupled to the first connection point and the positive electrode of the first battery pack;
      a sixth connection point coupled to the second connection point and the negative electrode of the first battery pack;
      a seventh connection point coupled to the third connection point and the first output end; and
      an eighth connection point coupled to the fourth connection point and the second output end; and
   a controller coupled to the first battery pack, the first bidirectional voltage transformation circuit, the first bypass circuit, and the charging circuit,
   wherein the controller is configured to control an on-off status of the first switching device, an on-off status of the second switching device, and a working status of the first bidirectional voltage transformation circuit based on a voltage of the first battery pack and a parameter of the first battery pack, and
   wherein the first bidirectional voltage transformation circuit is configured to perform a bidirectional voltage transformation between the first battery pack and the charging circuit.

2. The distributed battery pack power supply system of claim 1, wherein the first bidirectional voltage transformation circuit comprises a first switch, a second switch, a third switch, a fourth switch, a fifth switch, a sixth switch, and an inductor, wherein a first end of the first switch is coupled to the fifth connection point, wherein a first end of the second switch is coupled to the sixth connection point, wherein a first end of the fifth switch is coupled to the seventh connection point, wherein a first end of the sixth switch is coupled to the eighth connection point, wherein a second end of the first switch is coupled to a first end of the third switch and a first end of the inductor, wherein a second end of the fifth switch is coupled to a first end of the fourth switch and a second end of the inductor, and wherein a second end of the second switch, a second end of the third switch, a second end of the fourth switch, and a second end of the sixth switch are coupled to each other.

3. The distributed battery pack power supply system of claim 2, further comprising:
   a second battery pack, comprising:
      a positive electrode; and
      a negative electrode;
   a second bypass circuit, coupled between the second battery pack and the charging circuit, the second bypass circuit comprising:
      a ninth connection point coupled to the positive electrode of the second battery pack;
      a tenth connection point coupled to the negative electrode of the second battery pack;
      an eleventh connection point coupled to the first output end of the charging circuit;
      a twelfth connection point coupled to the second output end of the charging circuit;
      a third switching device configured to couple the ninth connection point and the eleventh connection point to form a third circuit that is enabled or disabled; and
      a fourth switching device configured to couple the tenth connection point and the twelfth connection point to form a fourth circuit that is enabled or disabled; and
   a second bidirectional voltage transformation circuit, coupled between the second battery pack and the charging circuit, and the second bidirectional voltage transformation circuit comprising:
      a thirteenth connection point coupled to the ninth connection point and the positive electrode of the second battery pack;

a fourteenth connection point coupled to the tenth connection point and the negative electrode of the second battery pack;

a fifteenth connection point coupled to the eleventh connection point and the first output end; and a sixteenth connection point coupled to the twelfth connection point and the second output end;

wherein the controller is coupled to the second battery pack, the second bidirectional voltage transformation circuit, and the second bypass circuit, wherein the controller is configured to control an on-off status of the third switching device, an on-off status of the fourth switching device, and a working status of the second bidirectional voltage transformation circuit based on a voltage of the second battery pack and a parameter of the second battery pack, and wherein the second bidirectional voltage transformation circuit is configured to perform a bidirectional voltage transformation between the second battery pack and the charging circuit.

4. The distributed battery pack power supply system of claim 3, wherein the first battery pack and the second battery pack are of a same type, and the controller is further configured to:

determine a voltage difference between the first battery pack and the second battery pack;

control the first switching device and the second switching device in the first bypass circuit to be closed to enable the first circuit and the second circuit;

control the third switching device and the fourth switching device in the second bypass circuit to be closed to enable the third circuit and the fourth circuit when the voltage difference is less than or equal to a first threshold and the charging circuit is in a working state; and control an output current of the charging circuit to be less than or equal to a sum of charging currents of the first battery pack and the second battery pack.

5. The distributed battery pack power supply system of claim 3, wherein the first battery pack and the second battery pack are of a same type, and wherein the controller is further configured to:

determine a voltage difference between the first battery pack and the second battery pack during charging;

control the first switching device and the second switching device in the first bypass circuit to be closed to enable the first circuit and the second circuit, and control an output current of the charging circuit to be less than or equal to a charging current of the first battery pack to charge the first battery pack when the voltage difference is greater than a first threshold and the charging circuit is in a working state, wherein a voltage of the first battery pack is less than a voltage of the second battery pack; or control the third switching device and the fourth switching device in the second bypass circuit to be closed to enable the third and the fourth circuit, and control the output current of the charging circuit to be less than or equal to a sum of charging currents of the first battery pack and the second battery pack when the voltage difference is less than a second threshold.

6. The distributed battery pack power supply system of claim 3, wherein the first battery pack is an energy-type battery pack and the second battery pack is a power-type battery pack, and wherein the controller is further configured to:

determine, during charging, whether a voltage of the energy-type battery pack is less than or equal to a voltage of the power-type battery pack;

control the first bidirectional voltage transformation circuit to work in a step-down mode when the voltage of the energy-type battery pack is less than or equal to the voltage of the power-type battery pack; or control the first bidirectional voltage transformation circuit to work in a step-up mode when the voltage of the energy-type battery pack is greater than the voltage of the power-type battery pack;

control an output current of the first bidirectional voltage transformation circuit to be less than or equal to a charging current of the energy-type battery pack;

control the third switching device and the fourth switching device in the second bypass circuit to be closed to enable the third circuit and the fourth circuit; and control the charging circuit to work with an output current of the charging circuit being less than or equal to a sum of an input current of the first bidirectional voltage transformation circuit and a charging current of the power-type battery pack.

7. The distributed battery pack power supply system of claim 3, wherein the distributed battery pack power supply system is further configured to provide a power to a load, wherein the load is coupled between the seventh connection point and the eighth connection point of the first bidirectional voltage transformation circuit, and coupled between the fifteenth connection point and the sixteenth connection point of the second bidirectional voltage transformation circuit, wherein the controller is further configured to:

determine a voltage difference between the first battery pack and the second battery pack;

control the first switching device and the second switching device in the first bypass circuit to be closed to enable the first circuit and the second circuit; and control the third switching device and the fourth switching device in the second bypass circuit to be closed to enable the third circuit and the fourth circuit when the distributed battery pack power supply system is in a discharge state and the voltage difference is less than or equal to a third threshold.

8. The distributed battery pack power supply system of claim 3, wherein the first battery pack and the second battery pack are of a same type, and wherein the controller is further configured to:

determine a voltage difference between the first battery pack and the second battery pack;

control the first switching device and the second switching device in the first bypass circuit to be closed to enable the first circuit and the second circuit and discharge the first battery pack when the distributed battery pack power supply system is in a discharge state and the voltage difference is greater than a third threshold, wherein a voltage of the first battery pack is greater than a voltage of the second battery pack; and control the third switching device and the fourth switching device in the second bypass circuit to be closed to enable the third circuit and the fourth circuit when the voltage difference is less than or equal to a fourth threshold.

9. The distributed battery pack power supply system of claim 3, wherein the first battery pack is an energy-type battery pack and the second battery pack is a power-type battery pack, and wherein the controller is further configured to:

determine whether a voltage of the energy-type battery pack is greater than a voltage of the power-type battery pack;

control the first bidirectional voltage transformation circuit to work in a step-up mode when the voltage of the energy-type battery pack is less than or equal to the voltage of the power-type battery pack; or control the first bidirectional voltage transformation circuit to work in a step-down mode when the voltage of the energy-type battery pack is greater than the voltage of the power-type battery pack;

control an input current of the first bidirectional voltage transformation circuit to be less than or equal to a discharging current of the energy-type battery pack; and control the third switching device and the fourth switching device in the second bypass circuit to be closed to enable the third circuit and the fourth circuit.

10. The distributed battery pack power supply system of claim 3, wherein the controller is further configured to determine types of the first battery pack and the second battery pack are different when the first battery pack and the second battery pack are inconsistent in at least one of: chemical systems, capacities, internal resistances, or cycle lives.

11. The distributed battery pack power supply system of claim 3, wherein the controller is further configured to determine types of the first battery pack and the second battery pack are same when the first battery pack and the second battery pack are consistent in chemical systems, capacities, internal resistances, and cycle lives.

12. An electric vehicle, comprising:
a motor; and
a distributed battery system coupled to the motor and configured to provide power to the motor, wherein the distributed battery system comprises:
 a charging input end;
 a first battery pack, comprising:
  a positive electrode; and
  a negative electrode;
 a charging circuit, comprising:
  an input end coupled to the charging input end;
  a first output end; and
  a second output end;
 a first bypass circuit, coupled between the first battery pack and the charging circuit, the first bypass circuit comprising:
  a first connection point coupled the positive electrode of the first battery pack;
  a second connection point coupled the negative electrode of the first battery pack;
  a third connection point coupled to the first output end of the charging circuit;
  a fourth connection point coupled to the second output end of the charging circuit;
  a first switching device configured to couple the first connection point and the third connection point to form a first circuit that is enabled or disabled; and
  a second switching device configured to couple the second connection point and the fourth connection point to form a second circuit that is enabled or disabled;
 a first bidirectional voltage transformation circuit, coupled between the first battery pack and the charging circuit, and the first bidirectional voltage transformation circuit comprising:

a fifth connection point coupled to the first connection point and the positive electrode of the first battery pack;
  a sixth connection point coupled to the second connection point and the negative electrode of the first battery pack;
  a seventh connection point coupled to the third connection point and the first output end; and
  an eighth connection point coupled to the fourth connection point and the second output end; and
 a controller coupled to the first battery pack, the first bidirectional voltage transformation circuit, the first bypass circuit, and the charging circuit,
 wherein the controller is configured to control an on-off status of the first switching device, an on-off status of the second switching device, and a working status of the first bidirectional voltage transformation circuit based on a voltage of the first battery pack and a parameter of the first battery pack, and
 wherein the first bidirectional voltage transformation circuit is configured to perform a bidirectional voltage transformation between the first battery pack and the charging circuit.

13. The electric vehicle of claim 12, wherein the first bidirectional voltage transformation circuit comprises a first switch, a second switch, a third switch, a fourth switch, a fifth switch, a sixth switch, and an inductor, wherein a first end of the first switch is coupled to the fifth connection point, wherein a first end of the second switch is coupled to the sixth connection point, wherein a first end of the fifth switch is coupled to the seventh connection point, wherein a first end of the sixth switch is coupled to the connection point, wherein a second end of the first switch is coupled to a first end of the third switch and a first end of the inductor, wherein a second end of the fifth switch is coupled to a first end of the fourth switch and a second end of the inductor, and wherein a second end of the second switch, a second end of the third switch, a second end of the fourth switch, and a second end of the sixth switch are coupled to each other.

14. The electric vehicle of claim 12, further comprising:
 a second battery pack, comprising:
  a positive electrode; and
  a negative electrode;
 a second bypass circuit, coupled to the second battery pack, and comprising:
  a third switching device configured to couple a ninth connection point and an eleventh connection point; and
  a fourth switching device configured to couple a tenth connection point and a twelfth connection point;
  wherein the ninth connection point is coupled to the positive electrode of the second battery pack, and wherein the tenth connection point is coupled to the negative electrode of the second battery pack;
 a second bidirectional voltage transformation circuit, comprising:
  a thirteenth connection point coupled to the ninth connection point and the positive electrode of the second battery pack;
  a fourteenth connection point coupled to the tenth connection point and the negative electrode of the second battery pack;
  a fifteenth connection point coupled to the eleventh connection point; and
  a sixteenth connection point coupled to the twelfth connection point, wherein the second bidirectional voltage transformation circuit is coupled to the second battery pack and the second bypass circuit through the thirteenth connection point, the fourteenth connection point, the fifteenth connection point, and the sixteenth connection point.

15. A distributed battery circuit, configured to couple to a first battery pack comprising a positive electrode and a negative electrode, the distributed battery circuit comprising:
    a bypass circuit, coupled to the first battery pack, and the bypass circuit comprising:
        a first switching device, coupled between a first connection point and a third connection point; and
        a second switching device, coupled between a second connection point and a fourth connection point,
        wherein the first connection point is coupled to the positive electrode of the first battery pack, and wherein the second connection point is coupled the negative electrode of the first battery pack; and
    a bidirectional voltage transformation circuit, comprising:
        a fifth connection point coupled to the first connection point and the positive electrode;
        a sixth connection point coupled to the second connection point and the negative electrode;
        a seventh connection point coupled to the third connection point; and
        an eighth connection point coupled to the fourth connection point,
        wherein the bidirectional voltage transformation circuit is coupled to the first battery pack and the bypass circuit through the fifth connection point, the sixth connection point, the seventh connection point, and the eighth connection point.

16. The distributed battery circuit of claim 15, wherein the bidirectional voltage transformation circuit comprises a first switch, a second switch, a third switch, a fourth switch, a fifth switch, a sixth switch, and an inductor, wherein a first end of the first switch is coupled to the fifth connection point, wherein a first end of the second switch is coupled to the sixth connection point, wherein a first end of the fifth switch is coupled to the seventh connection point, wherein a first end of the sixth switch is coupled to the connection point, wherein a second end of the first switch is coupled to a first end of the third switch and a first end of the inductor, wherein a second end of the fifth switch is coupled to a first end of the fourth switch and a second end of the inductor, and wherein a second end of the second switch, a second end of the third switch, a second end of the fourth switch, and a second end of the sixth switch are coupled to each other.

17. The distributed battery circuit of claim 15, further comprising:
    a second battery pack, comprising:
        a positive electrode; and
        a negative electrode;
    a second bypass circuit, coupled to the second battery pack, and comprising:
        a third switching device coupled between a ninth connection point and an eleventh connection point; and
        a fourth switching device coupled between a tenth connection point and a twelfth connection point,
        wherein the ninth connection point is coupled to the positive electrode of the second battery pack, and wherein the tenth connection point is coupled the negative electrode of the second battery pack;
    a second bidirectional voltage transformation circuit, comprising:
        a thirteenth connection point coupled to the ninth connection point and the positive electrode of the second battery pack;
        a fourteenth connection point coupled to the tenth connection point and the negative electrode of the second battery pack;
        a fifteenth connection point coupled to the eleventh connection point, and
        a sixteenth connection point coupled to the twelfth connection point,
        wherein the second bidirectional voltage transformation circuit is coupled to the second battery pack and the second bypass circuit through the thirteenth connection point, the fourteenth connection point, the fifteenth connection point, and the sixteenth connection point.

18. A controller for a distributed battery, wherein the distributed battery comprises a first battery pack and a second battery pack coupled in parallel, the first battery pack is coupled to a charging circuit via a first bypass circuit and a first bidirectional voltage transformation circuit, and the second battery pack is coupled to the charging circuit via a second bypass circuit and a second bidirectional voltage transformation circuit, the controller comprising:
    a first voltage sampling circuit, configured to obtain a first voltage of the first battery pack;
    a second voltage sampling circuit, configured to obtain a second voltage of the second battery pack; and
    a processor configured to control charging or discharging states of the first battery pack and the second battery pack based on the first voltage of the first battery pack and the second voltage of the second battery pack, and parameters of the first battery pack and the second battery pack.

19. The controller of claim 18, wherein the processor is configured to:
    determine whether types of the first battery pack and the second battery pack are same based on the parameters of the first battery pack and the second battery pack, wherein the parameters of the first battery pack and the second battery pack comprises chemical systems, capacities, internal resistances, and cycle lives, wherein the types of the first battery pack and the second battery pack are different when the first battery pack and the second battery pack are inconsistent in at least one of: chemical systems, capacities, internal resistances, or cycle lives, and wherein the types of the first battery pack and the second battery pack are the same when the first battery pack and the second battery pack are consistent in chemical systems, capacities, internal resistances, and cycle lives.

20. The controller of claim 18, wherein the types of the first battery pack and the second battery pack are same, and wherein the processor is configured to:
    determine a voltage difference between the first battery pack and the second battery pack is less than or equal to a first threshold; and
    control the first bypass circuit and the second bypass circuit to charge the first battery pack and the second battery pack.

21. The controller of claim 18, wherein the first battery pack and the second battery pack are of a same type, and wherein the processor is configured to:
    determine a voltage difference between the first battery pack and the second battery pack is greater than a first threshold, wherein a voltage of the first battery pack is less than a voltage of the second battery pack;

control the first bypass circuit to first charge the first battery pack;

control the first bypass circuit and the second bypass circuit to charge the first battery pack and the second battery pack when the voltage difference is less than or equal to a second threshold.

22. The controller of claim 18, wherein the first battery pack is an energy-type battery pack and the second battery pack is a power-type battery pack, and wherein the processor is configured to:

determine whether a voltage of the energy-type battery pack is less than or equal to a voltage of the power-type battery pack;

control the first bidirectional voltage transformation circuit to work in a step-down mode when the voltage of the energy-type battery pack is less than or equal to the voltage of the power-type battery pack; or control the first bidirectional voltage transformation circuit to work in a step-up mode when the voltage of the energy-type battery pack is greater than the voltage of the power-type battery pack;

control an output current of the first bidirectional voltage transformation circuit to be less than or equal to a charging current of the energy-type battery pack;

control the first bypass circuit to charge the energy-type battery pack; and control the first bypass circuit and the second bypass circuit to charge the first battery pack and the second battery pack.

23. The controller of claim 18, wherein the processor is configured to control an output current of the charging circuit to be less than or equal to a sum of charging currents of the first battery pack and the second battery pack when charging the first battery pack and the second battery pack.

24. The controller of claim 18, wherein types of the first battery pack and the second battery pack are same, and wherein the processor is configured to:

determine a voltage difference between the first battery pack and the second battery pack is less than or equal to a third threshold; and control the first bypass circuit and the second bypass circuit to discharge the first battery pack and the second battery pack.

25. The controller of claim 18, wherein the first battery pack and the second battery pack are of a same type, and where the processor is configured to:

determine a voltage difference between the first battery pack and the second battery pack is greater than a third threshold, wherein a voltage of the first battery pack is higher than a voltage of the second battery pack;

control the first bypass circuit to first discharge the first battery pack; and control the first bypass circuit and the second bypass circuit to discharge the first battery pack and the second battery pack when the voltage difference is less than or equal to a fourth threshold.

26. The controller of claim 18, wherein the first battery pack is an energy-type battery pack and the second battery pack is a power-type battery pack, and wherein the processor is configured to:

determine whether a voltage of the energy-type battery pack is greater than a voltage of the power-type battery pack;

control the energy-type battery pack to be in a first working mode in which the energy-type battery pack is discharged after being stepped up when the voltage of the energy-type battery pack is less than or equal to the voltage of the power-type battery pack;

control the energy-type battery pack to be in a second working mode in which the energy-type battery pack is discharged after being stepped down when the voltage of the energy-type battery pack is greater than the voltage of the power-type battery pack;

control an input current of the first bidirectional voltage transformation circuit to be less than or equal to a discharging current of the energy-type battery pack; and control the first bypass circuit and the second bypass circuit to discharge the power-type battery pack and the energy-type battery pack.

* * * * *